United States Patent [19]
Volcheff et al.

[11] Patent Number: 5,330,147
[45] Date of Patent: Jul. 19, 1994

[54] VIDEO MONITOR CLAMP

[75] Inventors: Eric B. Volcheff, Manitowoc; Robert W. Wacker, Plymouth; Dale M. Hemberger, Sheboygan, all of Wis.

[73] Assignee: Mayline Company, Inc., Sheboygan, Wis.

[21] Appl. No.: 7,529

[22] Filed: Jan. 22, 1993

[51] Int. Cl.$^5$ .............................................. A47B 97/00
[52] U.S. Cl. .............................. 248/316.4; 248/231.4; 248/500; 248/917
[58] Field of Search ............... 248/551, 680, 681, 154, 248/229, 231.4, 310, 316.4, 917, 500, 505

[56] References Cited

U.S. PATENT DOCUMENTS

| | | | |
|---|---|---|---|
| 1,209,560 | 12/1916 | Cosner | 248/316.4 X |
| 1,765,727 | 6/1930 | Kurowski | 248/680 |
| 2,135,191 | 11/1938 | McBrady | 248/316.4 X |
| 2,538,449 | 1/1951 | Freshwater | 248/229 X |
| 2,619,307 | 11/1952 | Cramer | 248/680 |
| 2,666,612 | 1/1954 | Howell | 248/229 X |
| 2,895,702 | 7/1959 | Pierce | 248/310 X |
| 2,986,366 | 5/1961 | Wesson | 248/316.4 X |
| 3,008,618 | 11/1961 | Watts et al. | 248/310 X |
| 3,017,152 | 1/1962 | Alpaugh | 248/310 X |
| 4,368,863 | 1/1983 | Gentile | 248/505 X |
| 4,585,202 | 4/1986 | Parsekian | 248/500 X |
| 4,605,188 | 8/1986 | Goetz . | |
| 4,640,485 | 2/1987 | Day et al. . | |
| 4,802,708 | 2/1989 | Vos et al. | 248/316.4 X |
| 4,884,773 | 12/1989 | Becker . | |
| 5,076,079 | 12/1991 | Monoson et al. | 248/680 X |
| 5,169,114 | 12/1992 | O'Neill | 248/316.4 X |

FOREIGN PATENT DOCUMENTS 384017 12/1932 United Kingdom ............. 248/231.4

*Primary Examiner*—David A. Scherbel
*Assistant Examiner*—Derek J. Berger
*Attorney, Agent, or Firm*—Andrus, Sceales, Starke & Sawall

[57] ABSTRACT

A clamp assembly for adjustably mounting a video monitor or CPU to a supporting table which is tiltable out of a horizontal plane includes a pair of main clamp members which may be slid onto the table to hook around and extend between the front and rear edges of the table and a pair of angular cross clamp members threadably and adjustably attached between the main clamp members. The cross clamp members are adapted to be initially slid apart from one another a distance sufficient to allow a monitor to be placed therebetween and over the main clamp members. The cross clamp members are then slid toward one another and into engagement with the front and rear edges above the monitor base and tightened in position to hold the monitor against inadvertent sliding movement as a result of tilting of the table. The entire clamping assembly may be mounted and utilized without cutting, drilling, or in any other way disturbing the integrity of the table top.

9 Claims, 3 Drawing Sheets

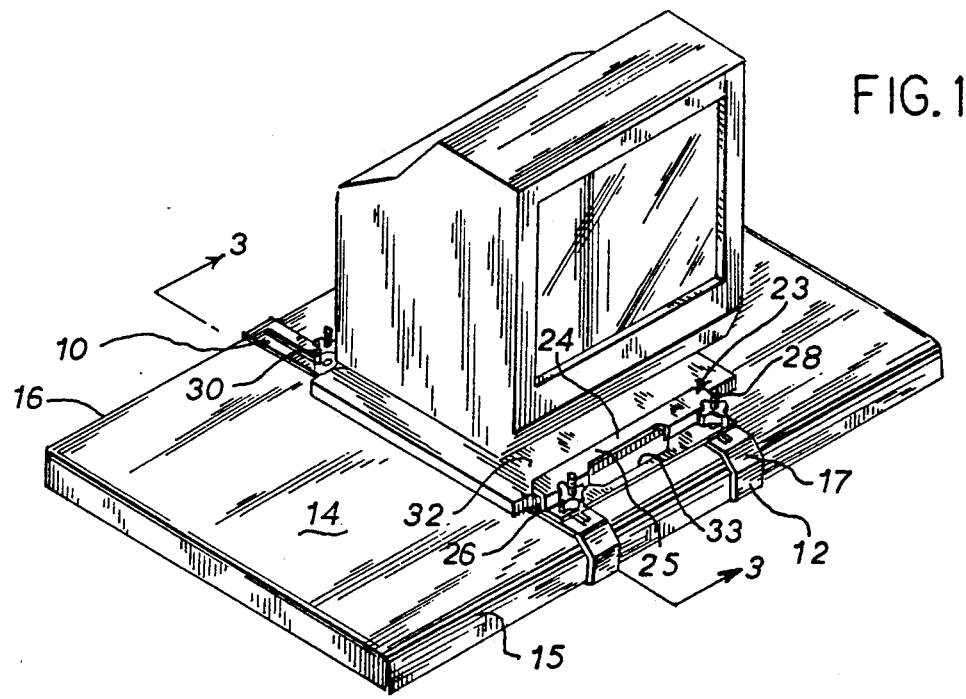
FIG. 1
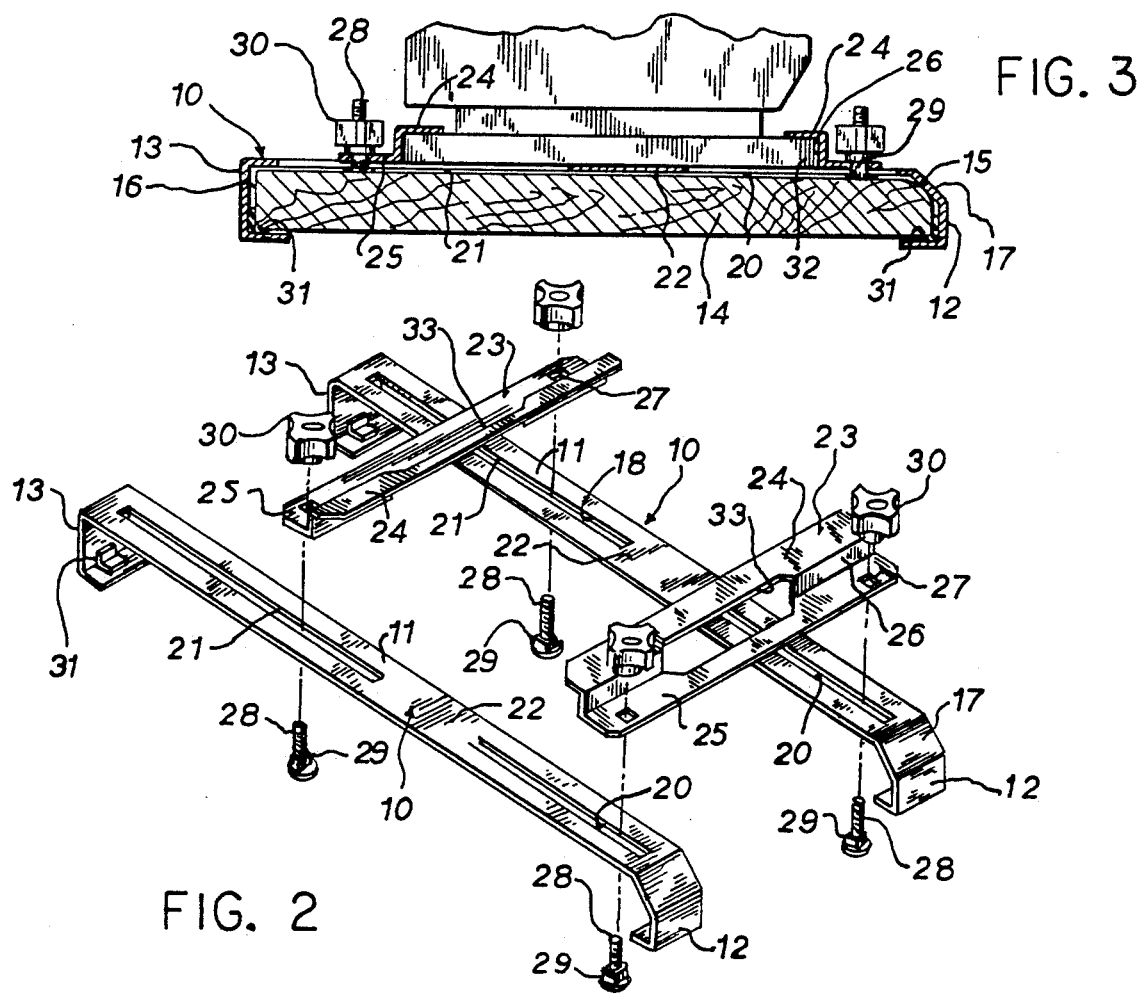
FIG. 3
FIG. 2

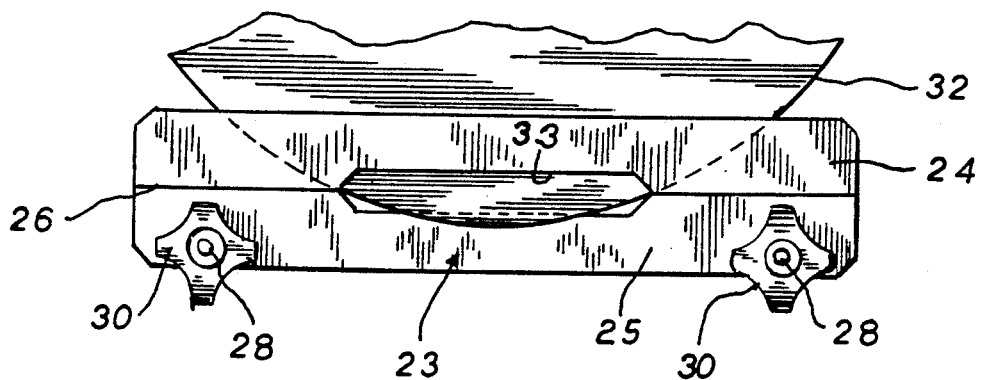
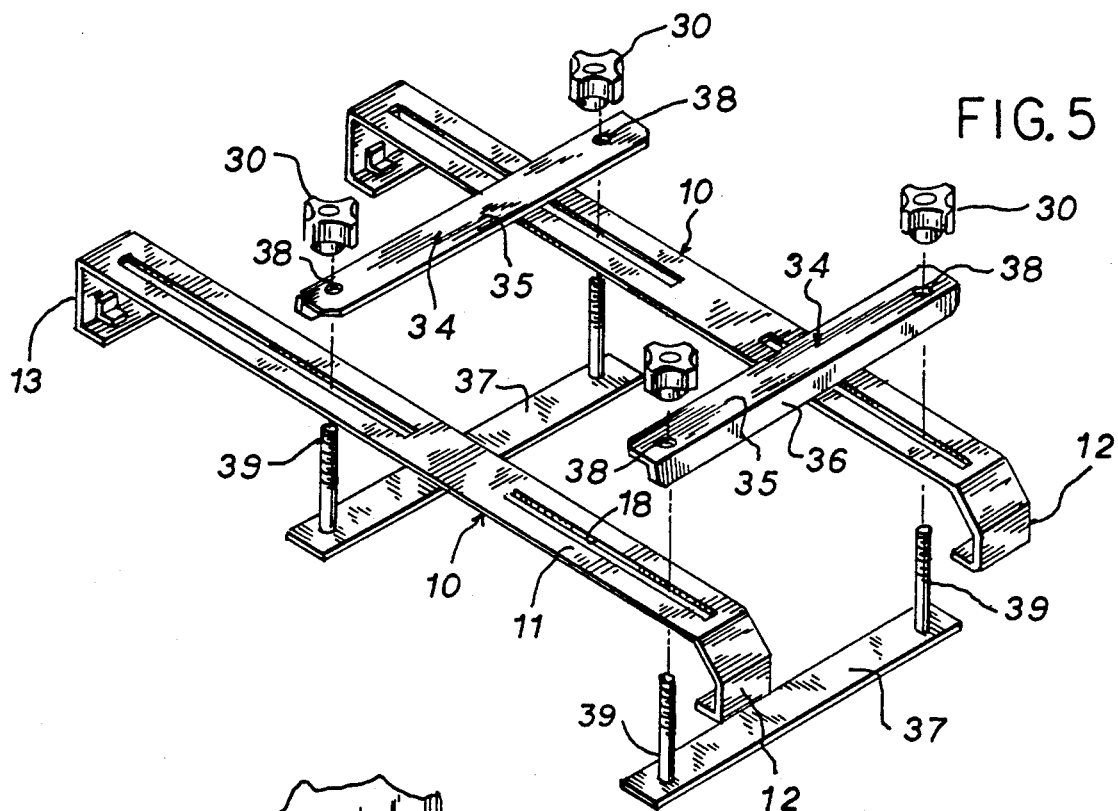
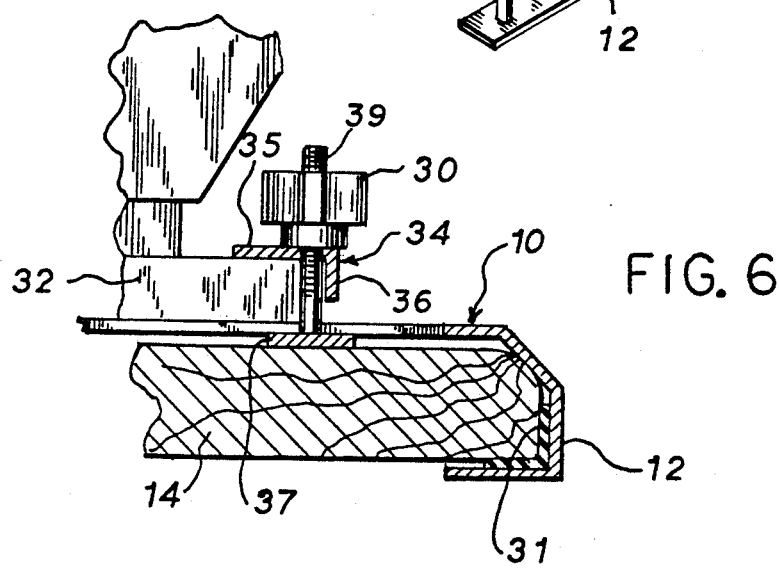

VIDEO MONITOR CLAMP

BACKGROUND OF THE INVENTION

The present invention pertains to a clamp for securing a video monitor to a table top and, more particularly, to a clamp assembly for securely attaching a video monitor to a table which may be adjustably tilted out of a horizontal plane.

It is known to provide video display monitors with supporting bases with respect to which the monitor is universally adjustable to position the screen for the convenience of the user. U.S. Pat. Nos. 4,605,188 and 4,640,485 are generally representative of the many types of universally adjustable monitor supports in the prior art which provide horizontal rotational, vertical tilting, and vertical adjustable positioning of the monitor with respect to the supporting base. Because of the universal adjustability of the monitor in these units, they are intended to be placed on a horizontal table where the base tends to remain unmovably positioned.

There has been a trend, however, to provide desks and tables used to support computer terminals, display monitors and other related equipment with supporting top surfaces which are vertically adjustable and tiltable with respect to the horizontal. In particular, table tops or desk tops used to support a video monitor are provided with vertical and tilting adjustments to readily position the monitor screen in a position which is most suitable for the user, to facilitate ease of viewing, reduce glare, or to allow the monitor to be periodically repositioned as needed or desired. If the video monitor is placed on a table which is tiltable, means must be provided to secure the monitor base to the table so it will not inadvertently slide off of the supporting surface if the tilt angle becomes too extreme.

U.S. Pat. No. 4,884,773 discloses a computer terminal stand which includes a monitor-supporting table top which is tiltable to an inclined position and includes an adjustable clamping mechanism to hold the monitor on the table top when inclined. The clamping mechanism is adjustable to accommodate varying sizes of monitor bases and to adjust the position of the monitor on the table top. However, the clamping mechanism requires the table top to be provided with elongate through slots which present serious surface discontinuities in the table and severely limit the adaptability of the table surface for other uses.

It would be desirable, therefore, to have an adjustable monitor clamp to hold a video monitor on a tiltable table top which does not require cutting slots or drilling holes in the table. Such a clamp should be simple to use so that mounting and adjustment of the position of the monitor may be quickly and easily accomplished.

SUMMARY OF THE INVENTION

In accordance with the present invention, a clamp assembly is provided for adjustably mounting a video monitor to the flat supporting surface of a tiltable table. The clamp assembly is adapted to be used with a generally rectangular table in which a flat supporting surface extends between parallel front and rear edges for supporting a monitor positioned thereon. However, the clamp assembly may be easily adapted for use on a table with curved, rounded, or other non-parallel opposite edges. The clamp assembly includes a pair of main clamp members, each of which has a flat body portion that extends between hooked front and rear ends. The hooked ends are spaced by a distance equal to the distance between the front and rear edges of the table, thereby allowing the main clamp members to be slid onto the flat table surface from either end and positioned parallel to one another and spaced laterally apart. Each main clamp member has an open mounting slot in the flat body portion which extends along a portion of the length thereof. A pair of angular cross clamp members extends between the main clamp members generally perpendicular thereto. Each cross clamp member has an angular cross section which includes a first leg disposed parallel to the table surface and a pair of apertures each aligned with a mounting slot in one of the main clamp members. Threaded fastening means are slidably disposed in the mounting slots and extend upwardly through the apertures in the cross clamp members. Manually operable threaded tightening means are provided for engaging the fastening means to adjust the spacing between the cross clamp members and the main clamp members, such that the monitor may be placed on the table with the monitor base overlying the main clamp members, the threaded fastening means and cross clamp members adjusted along the mounting slots to bring the cross clamp members into engagement with the front and rear edges of the monitor base, and the tightening means adjusted to secure the monitor base in position on the table surface.

In one embodiment, each cross clamp member has a generally Z-shaped cross section including a center plate connecting oppositely extending legs, one of which legs forms said first leg and the other of which comprises a second leg that includes the apertures for receipt of the threaded fastening means. Each of the cross clamp members preferably includes an open central slot which is adapted to receive a monitor base with a curved edge. The open central slot preferably extends through the center plate and into adjacent portions of the oppositely extending first and second legs.

In another embodiment, each of the cross clamp members has a generally L-shaped cross section and the first leg is provided with the pair of apertures for receipt of the threaded fastening means. The threaded fastening means comprise a flat elongate base plate for each cross clamp member, which base plate is adapted to be positioned between the table surface and the main clamp members. A pair of threaded studs are each attached by one end to an end of the base plate and extend upwardly through the mounting slots in the main clamp members and the aligned apertures in the cross clamp members.

In one variation, the first leg of the L-shaped cross clamp member is positioned to overlie the edge of the monitor base and to provide a downward clamping force in response to adjustment of the tightening means. The L-shaped cross clamp member includes a vertically disposed face plate which is formed integrally with the first leg and, in another variation, the first leg is positioned to engage the main clamp members and the face plate is positioned to engage the vertical face of the monitor base edge.

BRIEF DESCRIPTION OF THE DRAWINGS

FIG. 1 is a perspective view of one embodiment of the clamp assembly of the present invention used to mount a video monitor on a table top.

FIG. 2 is an exploded perspective view of the clamp assembly of FIG. 1.

FIG. 3 is a sectional view taken on line 3—3 of FIG. 1.

FIG. 4 is a partial top plan view of the clamp assembly shown in FIG. 1.

FIG. 5 is an exploded perspective view of a second embodiment of the clamp assembly of the present invention.

FIG. 6 is a partial sectional view, similar to FIG. 3, showing the mounting of the clamp assembly of FIG. 5.

DETAILED DESCRIPTION OF THE PREFERRED EMBODIMENTS

Figure 7:
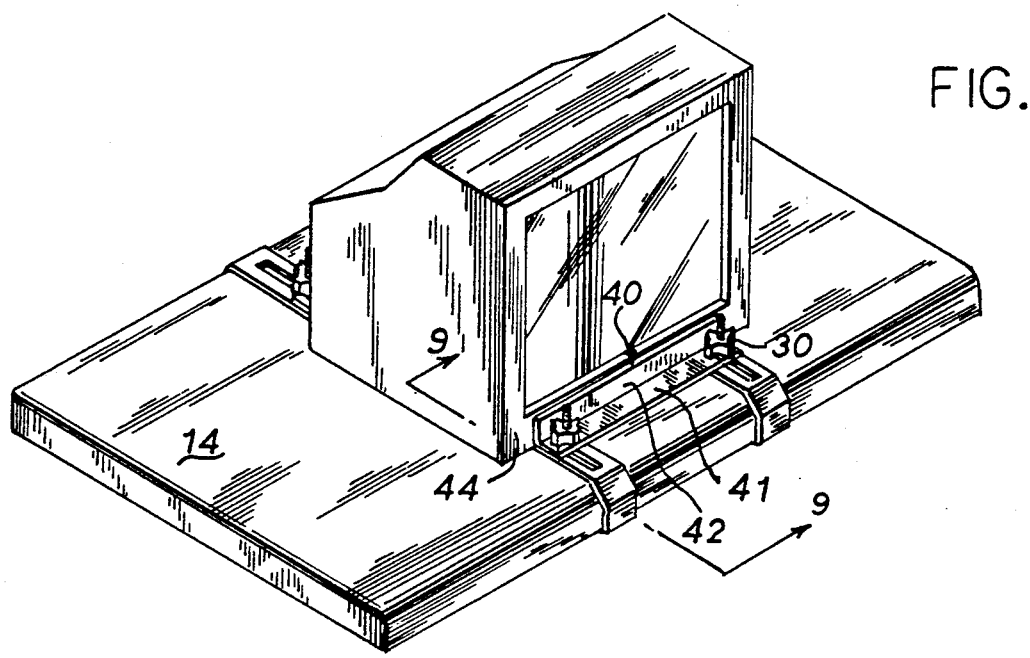
FIG. 7 is a perspective view of a third embodiment of the clamp assembly of the present invention used to mount a video monitor on a table surface.

The video monitor mounting clamp of the subject invention includes several embodiments which are intended to accommodate varying constructions of video monitors and to provide slightly different mounting or clamping characteristics. However, each of the embodiments operates in a substantially similar way and includes a number of identical components.

Referring first to the embodiment of the clamp shown in FIGS. 1-4, the clamp assembly includes a pair of main clamp members 10, each comprising a thin, flat body portion 11 which extends between a hooked front end 12 and a hooked rear end 13. The length of the main clamp member 10 is selected to fit the width of a rectangular table top 14 of a type used, for example, on an adjustable work station. In such a work station, one or two similar table tops 14 may be movable vertically up and down, horizontally back and forth, and tilted about a horizontal axis to orient the components carried thereon to suit the needs of the user. As is conventional construction, the table top 14 may include a rounded front edge 15 and a square rear edge 16, or both edges could be square or round. The hooked ends 12 and 13 of the main clamp member 10 are preferably specially formed to closely fit the respective front and rear edges 15 and 16 of the table top 14. Thus, the hooked front end 12 of the clamp member includes a tapered face portion 17 providing a transition between the body portion 11 and the hooked end to better fit the contour of the rounded front edge 15. The hooked rear end 13, on the other hand, is formed to the square shape of the rear edge 16 as shown. Each of the main clamp members 10 is provided with an open mounting slot 18 running substantially the entire length of the body portion 11. Preferably, the mounting slot is divided by a generally central web portion 22 into a front slot 20 and a rear slot 21. The mounting assembly also includes a pair of cross clamp members 23 which extend between the main clamp members 10 and are disposed generally perpendicular thereto. Each cross clamp member 23 has a generally angular cross section, the cross section of this embodiment being generally Z-shaped. Each cross clamp member, 23 includes flat first and second legs 24 and 25 which, in the assembled clamp, are disposed generally parallel to the top surface of the table 14, and are joined by an intermediate center plate 26. The second leg 25 includes a pair of spaced apertures 27 located near the ends thereof and adapted to receive the threaded upper ends of a pair of threaded fasteners 28. The fasteners 28 preferably comprise carriage bolts having the typical square neck portions 29 immediately adjacent the bolt heads. The square neck portions 29 of the carriage bolts 28 engage the sides of the mounting slot 18 and/or the apertures 27 in the second leg 25 of the cross clamp member, which may be formed of a square shape to engage the square neck portion of the bolt, all to prevent bolt rotation during mounting as will be described. A threaded knob 30 is provided for each carriage bolt 28 to facilitate attachment of the cross clamp members 23 to the main clamp members 10 for initial clamp assembly, which knobs 30 are subsequently tightened to maintain final clamping position of the assembly.

With the main clamp members 10 and cross clamp members 23 loosely assembled with the interconnecting bolts 28 and knobs 30, the main clamp members are slid onto one end of the table top 14 and moved laterally to any desired position thereon. Preferably, portions of the lower inside corners of each hooked front and rear end 12 and 13 are provided with small L-shaped bearing pads 31 to facilitate sliding movement of the main clamp members along the edges of the table top.

With the loosely assembled clamping mechanism slid to its desired position, the front and rear cross clamp members 23 are slid, respectively, along the front and rear slots 20 and 21 toward the front and rear table edges 15 and 16 a sufficient distance to allow the monitor base 32 to be placed therebetween and over the two main clamp members 10. The cross clamp members 23 are then slid back into engagement with the front and rear edges of the monitor base 32 with the first leg 24 overlying the base and the center plate 26 in engagement with the vertical edge face of the base. The threaded knobs 30 are then manually tightened to cause the second legs 25 of the two cross clamp members 23 to be drawn downwardly against the main clamp members, thereby fixing the position of the monitor on the table to prevent forward or rearward sliding of the monitor should the table top 14 be tilted too far in either direction. Depending on the vertical thickness of the monitor base 32, the first leg 24 of the cross clamp member may actually bear against the upper surface of the monitor base. However, such engagement is not necessary and the only requirement is that the monitor base be captured between the generally vertically disposed center plates 26 of the two cross clamp members to prevent forward or rearward sliding movement of the monitor. In other words, the first leg 24 of the cross clamp member 23 may in effect provide a holddown function, but such function is not necessary to the effective operation of the clamp assembly.

Some monitor bases are arcuate in shape, as shown in FIG. 4, and each cross clamp member 23 is provided with an open central slot 33 to accommodate the mounting of monitors having such a curved or arcuate base. The central slot 33 extends completely through the center plate 26 and a short distance into adjacent portions of the oppositely extending first and second legs 24 and 25. In this manner, the final positioning of the cross clamp members prior to tightening the threaded knobs 30 allows a curved monitor base edge 32 to extend through the slot, thereby allowing the monitor base to be captured therein, as shown.

In the alternate embodiment shown in FIGS. 5 and 6, the cross clamp members 34 are L-shaped in cross section and include an upper first leg 35 and an integral vertically extending face plate 36. The threaded fasteners are also modified from the previously described embodiment and include a base plate 37 to which a pair of threaded studs 39 are rigidly attached. The base plate 37 is adapted to lie under the main clamp members 10 with the threaded studs 39 extending upwardly through the respective front and rear mounting slots 20 and 21 and through apertures 38 in the first leg 35 of the cross clamp members 34. Because rigid attachment of the threaded studs to the base plate 37 will inherently prevent stud rotation as the knobs 30 are threaded onto the studs, it is not necessary to use square neck portions as are utilized with the carriage bolts 28 in the previously described embodiment. Thus, the apertures 38 in the cross clamp members 34 may be round instead of square. The integral base plate 37 and threaded studs 39 may be substituted for the pair of individual threaded carriage bolts 28 used with the cross clamp member 23 of the previously described embodiment and, similarly, the base plate 37 and studs 39 of this embodiment may be replaced by a pair of individual carriage bolts or other threaded fasteners 28.

Otherwise, mounting the clamp assembly on the table and securing the video monitor thereon is accomplished in a manner similar to the previously described embodiment. The arrangement is first loosely assembled by inserting the threaded studs 39 on each of the two base plates 37 through the respective slots 20 and 21 in the body portion 11 of the main clamp members 10. The spacing of the apertures 38 in the cross clamp members 34 corresponds to the spacing between each pair of threaded studs 36 so that the cross clamp members 34 can be readily assembled thereon and secured with the threaded knobs 30. With the loosely assembled clamp assembly in position on the table top 14, the subassemblies of the respective front and rear base plates and cross clamp members interconnected with the studs and threaded knobs are slid far enough apart to allow the monitor base to be placed therebetween and over the main clamp members 10. These subassemblies are then slid toward one another and into engagement with the front and rear edges of the monitor base, and the knobs 30 tightened to bring the first legs 35 of the cross clamp members into clamping engagement with the upper surface of the monitor base edge and the face plate 36 into engagement with the vertical face of the monitor base 32, front and rear. The clamp assembly of this embodiment, especially the L-shaped cross clamp members 34, is particularly well suited for the mounting of monitors with thicker supporting bases, i.e. base height vertically above the top of the table.

Figure 8:
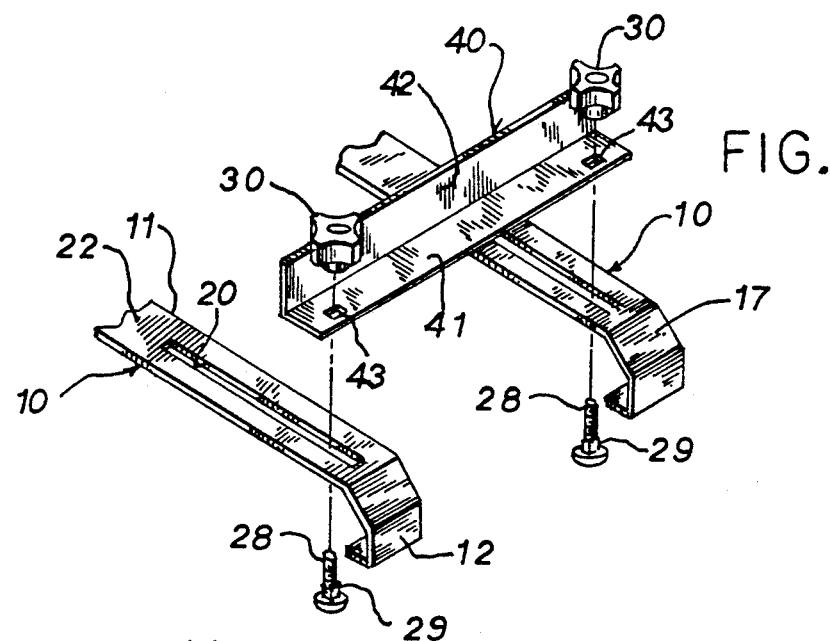
FIG. 8 is an exploded perspective view of a portion of the clamp assembly shown in FIG. 7.
Figure 9:
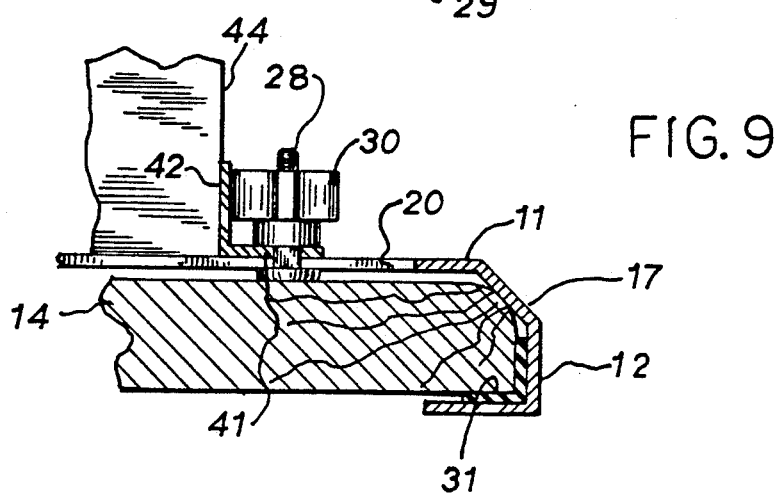
FIG. 9 is a partial sectional view taken on line 9—9 of FIG. 7.

A further embodiment of the monitor clamp of the present invention is shown in FIGS. 7–9. This embodiment is basically the same as the first embodiment shown in FIGS. 1–3, but includes a pair of somewhat simplified cross clamp members 40. Each cross clamp member 40 has an L-shaped cross section including a first leg 41 and a face plate 42. All of the remaining components of this clamp assembly are identical to those used in the first described embodiment and are, therefore, numbered identically in the description which follows. The first leg 41 is provided with a pair of spaced square apertures 43 for receipt of the carriage bolts 28 and engagement by square neck portions 29 on the bolts to prevent rotation during attachment of the threaded knobs 30, all in the manner previously described. The entire clamp mechanism is loosely assembled, slid onto the table top 14, initially positioned to allow the monitor to be placed over the main clamp members 10 and between the cross clamp members 40, the cross clamp members 40 slid into engagement with the front and rear edges of the monitor, and the knobs 30 tightened to retain the monitor between the face plates 42 of the front and rear cross clamp members 40. This embodiment of the clamp is particularly well suited for use with a video monitor which does not have a separate flanged base or, in other words, a monitor having a unitary cabinet or housing which does not permit the first leg to overlie the monitor base as do the legs 24 and 35 of cross clamp members 23 and 34 of the previously described embodiments.

A common and significant feature of each of the embodiments of the present invention is that it is not necessary to drill, slot or otherwise cut into the table top 14 to mount the monitor thereon. Similarly, the entire clamp assembly of each of the three described embodiments may be completely and easily removed with removal of the monitor, so that the entire table top is fully accessible and usable.

Each of the embodiments of the clamp assembly described hereinabove is readily adaptable to be used on a table surface which is other than rectangular in plan, such as one having rounded or curved opposite edges or a combination of one straight and round opposite edges. The hooked ends 12 and 13 of the main clamp members 10 could readily be angled slightly to accommodate non-parallel opposite table edges and the rigid connections between the parallel main clamp members which are provided by the cross clamp members in each embodiment would prevent the former from sliding along a curved table edge.

Various modes of carrying out the present invention are contemplated as being within the scope of the following claims particularly pointing out and distinctly claiming the subject matter which is regarded as the invention.

We claim:

1. A clamp assembly for adjustably mounting an electronic data station device having a supporting base to a tiltable supporting table having a flat supporting surface between parallel front and rear edges, said clamp assembly comprising:

a pair of main clamp members, each having a flat body portion extending between hooked front and rear ends spaced by a distance equal to a distance between the front and rear edges of the table, the hooked ends allowing the main clamp members to be slid laterally onto the flat supporting table surface with the hooked ends engaging the front and rear edges to position the main clamp members parallel to one another and spaced laterally apart at any selected position along said table edges;

each main clamp member having an open mounting slot in the flat body portion extending along substantially the entire length thereof;

a pair of angular cross clamp members extending between said main clamp members and generally perpendicular thereto, each cross clamp member having an angular cross section including a first leg disposed parallel to the table surface and a pair of apertures each aligned with a mounting slot in one main clamp member;

threaded fastening means slidably disposed in the mounting slots and extending upwardly through the apertures in the cross clamp members; and manually operable threaded tightening means for engaging said fastening means and adjusting the spacing between the cross clamp members and the positioning thereof along the main clamp members between the front and rear table edges;

whereby the device may be placed on the table with the base overlying the main clamp members, the threaded fastening means and cross clamp members adjusted along the mounting slots to bring the cross clamp members into engagement with the front and rear edges of the base of the device, and the tightening means adjusted to secure the base in a selected position anywhere on the table surface.

2. The clamp assembly as set forth in claim 1 wherein each of said cross clamp members comprises a generally Z-shaped cross section including a center plate connecting oppositely extending legs, one of which legs forms said first leg and the other of which legs comprises a second leg which includes said pair of apertures.

3. The clamp assembly as set forth in claim 2 wherein each of said cross clamp members includes an open central slot adapted to receive a curved edge of the monitor base.

4. The clamp assembly as set forth in claim 3 wherein said open central slot extends through the center plate into adjacent portions of said oppositely extending first and second legs.

5. The clamp assembly as set forth in claim 1 wherein each of said cross clamp members has a generally L-shaped cross section and said first leg includes said pair of apertures.

6. The clamp assembly as set forth in claim 5 wherein the other leg forming the L-shaped cross section of said cross clamp member comprises a vertically disposed face plate formed integrally with said first leg.

7. The clamp assembly as set forth in claim 6 wherein said first leg is positioned to engage said main clamp members and the face plate is positioned to engage the vertical face of the monitor base edge.

8. The clamp assembly as set forth in claim 1 wherein said threaded fastening means comprises:

a flat elongate base plate for each cross clamp member adapted to be positioned between the table surface and the main clamp members; and, a pair of threaded studs each attached by one end to an end of the base plate and extending upwardly therefrom through a mounting slot in the main clamp member and the aligned aperture in the cross clamp member.

9. The clamp assembly as set forth in claim 1 wherein said first leg is positioned to overlie the edge of the monitor base and provide a downward clamping force in response to adjustment of said tightening means.

* * * * *